Jan. 30, 1962     L. SADEL     3,018,687
EYEGLASS RETAINING ASSEMBLY
Filed Oct. 24, 1960
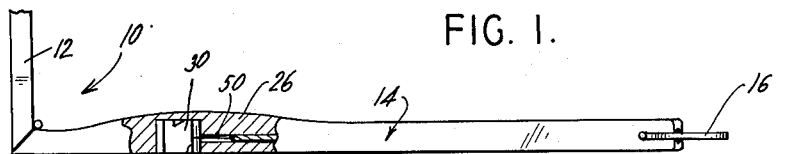
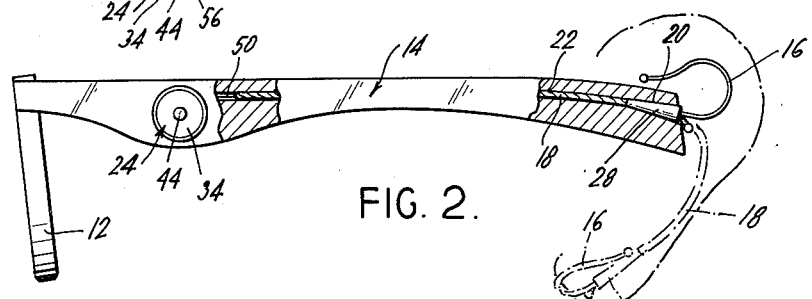
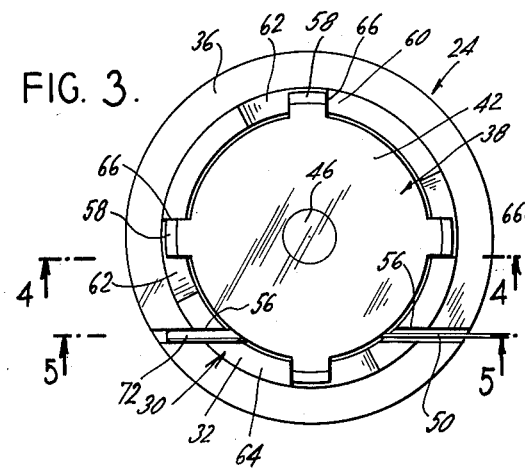
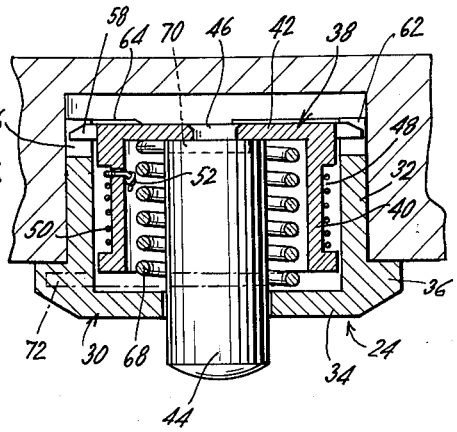
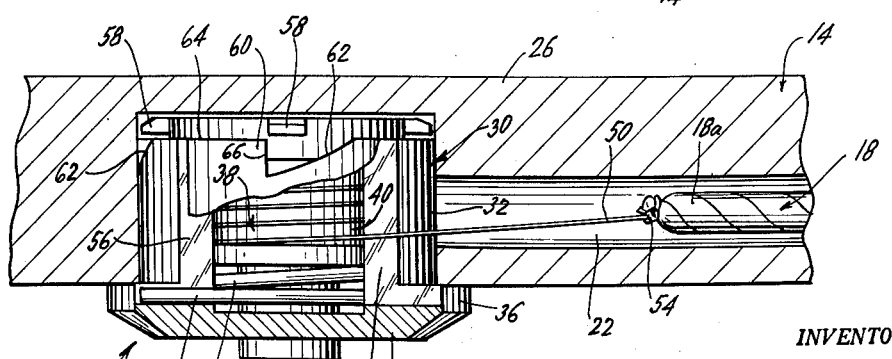
INVENTOR.
LEO SADEL
BY
*Amster & Levy*
ATTORNEYS

3,018,687
EYEGLASS RETAINING ASSEMBLY
Leo Sadel, 305 W. 86th St., New York, N.Y.
Filed Oct. 24, 1960, Ser. No. 64,483
6 Claims. (Cl. 88—52)

The present invention relates generally to eyeglasses and particularly to an assembly for securely retaining a pair of eyeglasses in position on the head of the wearer. The present invention may be advantageously employed by all persons who wear eyeglasses and is particularly advantageous for those persons who are engaged in strenuous activities which would be likely to dislodge their glasses.

The most commonly employed form of eyeglasses comprises two eyeglass lenses mounted in a front frame which extends across the face of the wearer and rests upon the bridge of the wearer's nose. At either side of the front frame there is connected a temple piece which extends rearwardly and is formed, at its terminal portion, with a curved ear engaging member. The eyeglasses are supported on the head of the wearer at a mid point on the wearer's nose bridge, and at the upper portions at each of the wearer's ears. In addition, lateral support is obtained from the contact between the inside of each of the temple pieces bearing against the sides of the wearer's head. Although this described form of eyeglasses is universally popular and serves its function quite well, it is well recognized that such eyeglasses are often less secure upon the head of the wearer than is necessary for the activity engaged in by the wearer. For example, in a large variety of differing sporting activities, it is often found necessary to add some supplemental means to the eyeglass frames in order to keep them retained upon the wearer's head. A commonly employed supplemental retaining means is a strap which extends from the terminal portion of one temple piece to the terminal portion of the other temple piece and which is adapted to be secured around the rearward portion of the wearer's head. Such a retaining means, although accomplishing its purpose of keeping the eyeglasses on the wearer's head, has several distinct disadvantages. The main disadvantages of this strap retainer is that it is both unsightly and uncomfortable. Since the glasses are pulled against the bridge of the wearer's nose, there is an uncomfortable pressure applied at that point. In addition, a strap extending around the back of the head is often unsightly and therefore, precludes the use of such a device for a large class of eyeglass wearers.

An eyeglass retaining device which eliminates these disadvantages has been provided which includes an ear lobe encircling member secured to the terminal portion of the temple piece, which ear lobe encircling member is adapted to be releasably secured to the lower portion of the ear. Such a construction enables the user to hook the ear lobe encircling member on the lower portion of the ear and thereby retaining the eyeglasses in place. Such a device is disclosed in my co-pending application, Serial No. 612,213, entitled "Eyeglass Attachment," filed on September 26, 1956. The present invention utilizes a lobe encircling member, as taught by my aforementioned patent application, mounted in a manner wherein additional advantageous features are provided for the wearer. Since it is often desirable to adjust the tightness of an eyeglass retaining device and it is further desirable to remove a pair of glasses while they are being worn, it would be advantageous to provide a lobe encircling member adapted to retain a pair of eyeglasses on the head of the eyeglass wearer which lobe encircling member is mounted to the eyeglasses by means of a flexible cable whose length could be easily and securely adjusted by the wearer.

Accordingly, it is an object of the present invention to provide an eyeglass retaining assembly adapted to provide one or more of the aforementioned advantageous eyeglass retaining features. Specifically, it is the object of the present invention to provide an eyeglass retaining assembly wherein the retaining device may be easily and securely adjusted with respect to the eyeglass frame.

It is further within the contemplation of the present invention to provide in an eyeglass frame a retaining assembly which may be hidden from external view.

It is still a further object of the present invention to provide an eyeglass retaining device on an eyeglass frame wherein the retaining device is connected to the eyeglass frame by a flexible cable whose length may be selectively adjusted by the wearer.

It is another object of the present invention to provide a retaining device for eyeglasses which may be placed in an inoperative position wherein the device does not interfere with the normal function of the eyeglasses and may be alternatively and selectively placed into an operative position wherein the retaining device may be adjusted to the particular requirements of the eyeglass wearer.

It is still further within the contemplation of the present invention to provide an eyeglass retaining device which will allow the wearer to remove his eyeglasses temporarily from in front of his eyes and replace same without disengaging the retaining device.

In accordance with an illustrative embodiment which demonstrates features of the present invention, there is provided an eyeglass frame of the type including a front frame carrying a pair of lenses and two (2) temple pieces which extend rearwardly from either side of the front frame. Each of the temple pieces includes an ear piece at its rearward end which is adapted to engage the upper portion of the wearer's ear. A retaining assembly is provided which comprises a lobe encircling member adapted to be engaged with the lower portion of the wearer's ear and which is secured to one end of a flexible cable which is secured at its other end to cable mounting means which are positioned within the temple piece. The cable mounting means includes an outer cylinder mounted within the temple piece forwardly of the ear piece. An inner cable-carrying drum is positioned for rotation within the outer cylinder and said other end of the cable is secured to the drum and adapted to be wound thereon. Spring means are provided within the cable mounting means which are effective to bias the drum for rotation in one direction thereby to wind the flexible cable around the drum. The drum and the cylinder are provided with interengaging ratchet means which prevent rotation therebetween in the direction of the spring bias when the ratchet are engaged. Ratchet release means are included within the cable mounting means which release means are effective to disengage the ratchet to allow rotation of the drum under influence of the spring bias thereby to wind the cable around the drum. A cable aperture is formed at the ear piece of the temple piece and a cable channel is formed in the body of the temple piece thereby providing a communication path for the cable interconnecting the cable mounting means and the cable aperture. The spring means are effective to draw the lobe-encircling member at the end of the cable toward the cable aperture when the ratchet releasing means are effective to disengage the ratchet. The ratchet means themselves are effective to provide an adjustment feature whereby the wearer may selectively vary the length of the cable which extends from the temple piece.

The above brief description, as well as further objects, features and advantages of the present invention will be best appreciated by reference to the following detailed description of the presently preferred embodiment when taken in conjunction with the accompanying drawings, wherein:

FIG. 1 is a top view partially in section, of a portion of an eyeglass incorporating an eyeglass retaining assembly according to the present invention;

FIG. 2 is an elevational view of the device shown in FIG. 1 with portions in section for the sake of clarity;

FIG. 3 is an enlarged elevational view of the rear side of the cable mounting means incorporated in the eyeglasses shown in FIGS. 1 and 2;

FIG. 4 is a sectional view of the device shown in FIG. 3 taken along the line 4—4 looking in the direction of the arrows and illustrating the cable mounting means with the ratchet means engaged thereby prohibiting rotation of the cable carrying drum under influence of the spring bias; and FIG. 5 is a sectional view taken along the line 5—5 of FIG. 3 and looking in the direction of the arrows illustrating the cable mounting means with the ratchet release means in operation such that the ratchet means are disengaged. FIG. 5 additionally shows a portion of the temple piece in section illustrating how the cable is secured to the cable mounting means for rotation thereabout.

Referring now specifically to the drawings, wherein there is shown in FIGS. 1 and 2 an eyeglass frame generally designated by the numeral 10 which includes a front frame member 12 and a left temple piece 14 hingedly connected thereto in the conventional manner. The eyeglass frame 10 similarly includes a right temple piece not shown in the drawings herein which, it will be understood, is a mirror image of the left temple frame 14. The conventional eyeglass frame 10 is provided with an eyeglass retaining assembly according to the present invention which includes an earlobe-encircling member 16 which is releasably secured to one end of a flexible cable assembly 18 which passes into a cable aperture 20 at the rearward end of the temple piece 14 and through a longitudinal cable channel 22 formed inside the temple piece 14. The earlobe-encircling member 16 may be shaped in conformity to the teachings of my copending application Serial No. 612,213, entitled "Eyeglass Attachment," filed on September 26, 1956. At its forward end, the flexible cable assembly 18 is secured to a cable mounting device generally designated by the numeral 24 which is mounted within a thickened portion 26 of the temple piece 14 at the forward portion thereof. Specific description of the cable mounting device 24 will be given below, however, it should be noted at this point that the cable mounting device 24 includes a spring biased drum which is effective to wind up the cable assembly 18 such that the lobe-encircling member 16 is drawn towards the aperture 20 at the rearward end of the temple piece 14. The cable mounting device 24 is provided with ratchet means which oppose the rotational bias such that the length of flexible cable assembly 18 which extends rearwardly out of the aperture 20 may be selectively varied by the wearer of the eyeglasses thereby to selectively adjust the tightness of the eyeglass retaining assembly upon the head of the wearer. Further, the wearer may selectively utilize the cable mounting device 24 to draw the complete length of the flexible cable assembly 18 into the body of the temple piece 14 when the wearer does not desire to utilize the retaining device. At those times, when the wearer does not desire to utilize the retaining device as illustrated herein, the lobe-encircling member 16 may be removed from the end of the cable 18. For this purpose, the lobe-encircling member 16 is secured to a releasable attachment device 28 which in turn is secured to the end of the flexible cable 18. The interengaging action of the lobe-encircling member 16 and the securement device 28 is fully described in my aforementioned co-pending application. The releasable securement device 28 is generally of a conical external configuration and the rearward end of the cable channel 22 is formed in a complementary conical shape such that the attachment device 28 is retained within the rearward end of the cable channel 22 when the cable 18 is drawn up by the mounting device 24. When the user desires to utilize the retaining device as taught herein, the lobe-encircling member 16 is engaged with the attachment device 28 and the user draws the cable assembly 18 outwardly from the rear of the temple piece 14 against the bias force of the cable mounting device 24. He then hooks the lobe-encircling member around the lower portion of his ear and adjusts the length of the cable 18 to securely retain the eyeglasses 10 onto his head.

The cable mounting device 24, which is shown in detail in FIGS. 2, 4 and 5, includes an outer cylinder, generally designated by the numeral 30, which is generally cup shaped having cylindrical walls 32 and a flat disc-like end face 34. A suitable cylindrical cavity is formed in the temple piece 14 of a diameter equal to the diameter of the cylindrical walls 32 and the outer cylinder 30 is pressed into the temple piece 14 with its shoulder 36 against the outside face of the temple piece 14. The internal end of the outer cylinder 30 is provided with a ratchet means which will be described more fully below.

Mounted within the outer cylinder 30 is an inner cable carrying drum, generally designated by the numeral 38. The drum 38 is similarly of a cup shaped configuration having upstanding side walls 40 and a flat end wall 42 which faces in the opposite direction from the end wall 32 of the outer cylinder 30. Projecting upwardly from the inside surface of the end wall 32 along the axis of the drum 38 there is secured a finger piece 44 which is rigidly secured to the drum 38 by its rivet-like projection held which is upset within a central opening in the end wall 32 as indicated at the connection 46. It will be appreciated that the interconnection between the finger piece 44 and the drum 38 at the point 46 effectively ties these two separate members into one solid body. The external diameter of the drum 38 is slightly less than the internal diameter of the cylindrical walls 32 of the outer cylinder 30 thereby providing for the smooth rotation of the drum 38 within the outer cylinder 30. An annular depression 48 is formed within the outside surface of the cylindrical walls 40 of the drum 38 which depression 48 is effective to carry a length of coiled nylon thread 50 which forms the forward portion of the cable assembly 18, the rearward portion of which comprises a length of cable 18a. The nylon thread 50 is secured at one end by a knot to the drum 38 and is secured at its other end to the flexible cable 18a by a suitable connection as indicated at 54 and best seen in FIG. 5. As shown in FIGS. 3 and 5, the nylon thread 50 extends tangentially outwardly from the annular depression 48 in the drum 38 through a slot 56 formed in the outer cylinder 30 in a plane tangential to the lower surface of the depression 48. The cable mounting device 24 is positioned within the temple piece 14 such that the slot 56 is directly in line with the cable channel 22 leading to the cable aperture 20 at the rearward end of the temple piece 14.

On the inner portion of the cable mounting device 24 there is provided interengaging ratchet means which prevent rotation of the drum 38 within the outer cylinder 30 in a clockwise direction as viewed in FIG. 3. Pawl members 58 extend radially outward form the end wall 42 of the drum 38 and are effective to engage four ratchet teeth 60 formed in the inside end of the cylindrical walls 32 of the outer cylinder 30. The ratchet teeth 60 are formed in the cylindrical walls 32 by cutouts which result in an inclined surface 62 which terminate at their upper ends in the end surface 64 of the cylindrical walls 32 and at their other ends abut the pawl engaging surface 66 which are parallel to the axis of the outer cylinder 30. It will be appreciated that the pawl members 58, extending outwardly from the drum 38, effectively engage the surfaces 66 on the outer cylinder 30 thereby preventing rotation of the drum 38 in a clockwise direction as viewed in FIG. 3. As the drum 38 is rotated in a counter clockwise direction, the individual pawl 58 will be lifted upwardly out of the ratchet teeth 60 along the inclined surfaces 62 such that the counter clockwise rotation may be maintained. It will further be appreciated that the ratchet device comprising the pawl members 58 and the ratchet teeth 60 will be ineffective to prevent the clockwise rotation of the drum 38 if the drum 38 is moved axially with respect to the outer cylinder 30 such that the pawl members 58 are in a plane beyond the end surfaces 64 of the cylindrical wall 32.

A coiled spring 68 is provided within the cylindrical walls 40 of the drum 38 and surrounding the cylindrical wall of the finger piece 44. The coiled spring 69 serves to exert two separate and independent bias forces within the cable mounting device 24. The first bias force is one which biases the cable carrying drum 38 towards the end wall 34 of the outer cylinder 30 thereby biasing the interengaging pawl and ratchet means into their engaged position. It will be appreciated that pressure applied to the protruding end of the finger piece 44 will be effective to counteract this axial bias force. A second bias force is provided between the outer cylinder 30 and the drum 38 which is effective to bias the drum 38 for rotation within the outer cylinder 30 in a clockwise direction as viewed in FIG. 3, that is, in a direction which is opposed by the interengaging pawl and ratchet means. The coiled spring 68 is secured at one end to the drum 38 by means of an integral, radially inwardly extending arm 70 which is received within the finger piece 44. The opposite end of the coiled spring 68 is formed with a tangentially outwardly extending arm 72 which is secured within an appropriate portion of the slot 56 on the opposite side of the outer cylinder 30 from that portion of the slot 56 through which the nylon thread 50 passes. It will be appreciated that the two extending arms 70, 72 of the coiled spring 68 are secured to the drum 38 and the outer cylinder 30 respectively to transmit force both axially and tangentially. After the respective parts of the cable mounting assembly 24 are placed in their proper position with respect to each other with extending arms 70, 72 of the coiled spring 68 secured within their appropriate openings, an initial rotational bias is imparted to the coiled spring 68 which bias is maintained by the interengaging action of the pawl members 58 and the ratchet teeth 60.

The operations of the retaining device according to the present invention will now be described to provide a more clear understanding of the device. When the eyeglasses 10 are desired to be used in the normal fashion, and when it is not deemed necessary to utilize the special retaining means provided according to the present invention, the wearer merely places the eyeglasses upon his head in the normal manner. In this mode of operation the retaining device of the present invention does not in any way interfere with the normal use of the eyeglasses 10. However, when it is deemed desirable to have some additional retaining means to secure the eyeglasses 10 onto the head of the wearer, the wearer withdraws the lobe-encirclnig piece 16 and a portion of the flexible cable 18a from the rearward portion of the temple piece 14. Sufficient cable 18a is withdrawn from the ear piece 14 to allow the wearer to easily place the ear encircling member 16 about the lower portion of his ear as is shown in phantom in FIG. 2. The pawl members 58 and the ratchet teeth 60 are effective to allow the nylon thread 50 to be withdrawn from the rotating drum 38 against the bias force of the coiled spring 68. As a portion of the flexible cable assembly 18 is withdrawn from the temple piece 14, the drum 38 is rotated in a counter clockwise direction as viewed in FIG. 3 and the respective pawl members 58 pass up the inclined surface 62 of each ratchet tooth 60. When the wearer has withdrawn as much of the flexible cable 18a outwardly from the temple piece as he desires, it is held in its withdrawn position by the interengagement of the pawl members 58 with their respective ratchet teeth 60. The user of the eyeglasses 10 then places the lobe encircling member 16 about the lower portion of his ear as is shown in phantom in FIG. 2 and then places the eyeglasses 10 in the preferred position upon his head. As the eyeglasses 10 are moved towards and placed against the wearer's face, the excess cable 18 which extends outwardly to the cable aperture 20 is taken up by simply depressing the finger piece 44 inwardly into the end face 34 of the outer cylinder 30. Depression of the finger piece 44 will be effective to extend the coiled spring 68 to move the pawl members 58 above the level of the ratchet teeth 60 thereby allowing the drum 38 to rotate in response to the bias force exerted by the coiled spring 68. This will be effective to coil the nylon thread 50 about the drum 38 thereby taking up any slack in the flexible cable assembly 18. It will be appreciated that the wearer may move his glasses forwardly by pulling slightly against the bias of the coiled spring 68 or may firmly position them tighter against his face by moving them rearwardly and depressing the finger piece 44 to take up any slack. It will further be realized that the wearer may quickly move the glasses 10 away from his face by simply moving them forwardly since the flexible cable 18 may be easily extended by the unwinding of the drum 38 in opposition to the relatively slight bias force exerted by the coiled spring 68.

From the foregoing it will be appreciated that there is provided in accordance with the present invention a retaining device for use with substantially ordinary eyeglass frame which enables the user to securely fasten his eyeglasses onto his head in an easily adjusted position and which enables the user to quickly move his eyeglasses away from his face without detaching the retaining means. Eyeglasses according to the present invention may also be utilized in the normal fashion without the use of the provided retaining device in a manner such that the provided retaining device does not interfere with any of the normal functions of the eyeglasses. Further, provisions are made whereby the lobe encircling device may be removed from the eyeglasses such that their outer appearance is substantially the same as a pair of eyeglasses which do not incorporate the advantageous features disclosed herein.

A latitude of modification, substitution and change is intended in the foregoing disclosure and in some instances some features of the invention may be used without a use of other corresponding features.

What I claim is:

1. In an eyeglass frame of the type including a front frame and a pair of rearwardly extending temple pieces having an ear-piece at their rearward ends, a retaining assembly comprising an earlobe-encircling member adapted to be engaged with the lower portion of the wearer's ear, a flexible cable assembly secured at one end to said earlobe-encircling member, and a cable mounting device within said temple piece to which is secured the other end of said cable assembly, said cable mounting device including a cable mounting drum and spring means to bias said drum for rotation to wind said cable thereupon, and releasable blocking means normally effective to oppose said bias on said drum, said releasable blocking means being selectively and manually releasable for allowing the rotation of said drum in response to said spring bias, said temple piece being formed with a cable channel between said mounting device and said ear-piece in which is contained said cable, said bias means being effective to draw said earlobe-encircling member towards said ear-piece thereby to retain said eyeglasses on the head of the wearer.

2. In an eyeglass frame of the type having a lens-carrying front frame and a temple piece extending rearwardly from the front frame and including an ear-piece at its rearward end adapted to engage the upper portion of the wearer's ear, a retaining assembly comprising an earlobe-encircling member adapted to be engaged with the lower portion of the wearer's ear, a flexible cable secured at one end to said member, and cable mounting means on said temple piece adjustably securing the other end of said cable to said temple piece, said earlobe-encricling member extending rearwardly from said ear-piece, said cable mounting means including an outer cylinder secured to said temple piece, an inner cable carrying drum positioned for rotation within said outer cylinder, said cable being secured to said drum and adapted to be wound thereon, means effective to bias said drum for rotation in one direction, interengaging ratchet means between said cylinder and said drum preventing rotation therebetween in the direction of said bias when said ratchet means is engaged, and ratchet release means effective to disengage said ratchet means to allow rotation of said drum such that said cable is wound therearound, said spring bias being effective to draw said lobe-encircling member towards said ear-piece and said ratchet means being effective to provide adjustment means to selectively vary the length of said cable extending from said temple piece.

3. In an eyeglass frame of the type having a lens-carrying front frame and a temple piece extending rearwardly from the front frame and including an ear-piece at its rearward end adapted to engage the upper portion of the wearer's ear, a retaining assembly comprising an earlobe-encircling member adapted to be engaged with the lower portion of the wearer's ear, a flexible cable assembly having one end secured to said member, and cable mounting means in said temple piece adjustably securing the other end of said cable to said temple piece, said temple piece being formed with a cable aperture and a cable channel interconnecting said cable mounting means and said aperture, said cable being partially contained within said channel with said earlobe-encircling member extending rearwardly from said aperture, said cable mounting means including an outer cylinder secured to said temple piece, an inner cable carrying drum positioned for rotation within said outer cylinder, said cable being secured to said drum and adapted to be wound thereon, means effective to bias said drum for rotation in one direction, interengaging ratchet means between said cylinder and said drum preventing rotation therebetween in the direction of said bias when said ratchet means is engaged, and ratchet release means effective to disengage said ratchet means to allow rotation of said drum such that said cable is wound therearound, said spring bias being effective to draw said earlobe-encircling member towards said cable aperture and said ratchet means being effective to provide adjustment means to selectively vary the length of said cable extending from said temple piece.

4. In an eyeglass frame of the type having a lens-carrying front frame and a temple piece extending rearwardly from the front frame and including an ear-piece at its rearward end adapted to engage the upper portion of the wearer's ear, a retaining assembly comprising an earlobe-encircling member adapted to be engaged with the lower portion of the wearer's ear, a flexible cable, means releasably securing one end of said cable to said member, and cable mounting means in said temple piece adjustably securing the other end of said cable to said temple piece, said temple piece being formed with a cable aperture at its rearward end and a cable channel interconnecting said cable mounting means and said aperture, said cable being partially contained within said channel with said earlobe-encircling member extending rearwardly from said aperture, said cable mounting means including an outer cylinder mounted within said temple piece, an inner cable-carrying drum positioned for rotation within said outer cylinder, said cable being secured to said drum and adapted to be wound thereon, spring means effective to bias said drum for rotation in one direction, interengaging ratchet means between said cylinder and said drum preventing rotation therebetween in the direction of said bias when said ratchet means is engaged, and ratchet means to allow rotation of said drum such that said cable is wound therearound, said spring bias being effective to draw said earlobe-encircling member towards said cable aperture and said ratchet means being effective to provide adjustment means to selectively vary the length of said cable extending from said temple piece.

5. In an eyeglass frame of the type having a lens-carrying front frame and a temple piece extending rearwardly from the front frame and including an ear-piece at its rearward end and adapted to engage the upper portion of the wearer's ear, a retaining assembly comprising an earlobe-encircling member adapted to be engaged with the lower portion of the wearer's ear, a flexible cable, means releasably securing one end of said cable to said member, and cable mounting means in said temple piece adjustably securing the other end of said cable to said temple piece, said temple piece being formed with a cable aperture at its rearward end and a cable channel interconnecting said cable mounting means and said aperture, said cable being partially contained within said channel with said earlobe-encircling member extending rearwardly from said aperture, said cable mounting means including an outer cylinder mounted to said temple piece, an inner cable carrying drum positioned for rotation within said outer cylinder, said cable being secured to said drum and adapted to be wound thereon, spring means effective to bias said drum for rotation in one direction, interengaging ratchet means between said cylinder and said drum preventing rotation therebetween in the direction of said bias when said ratchet means is engaged, said spring means being effective to maintain said ratchet means in interengagement, and ratchet release means including a finger piece effective upon pressure exerted by the wearer to oppose said spring means and to thereby disengage said ratchet means to allow rotation of said drum such that said cable is wound therearound, said spring bias being effective to draw said earlobe-encircling member towards said cable aperture and said ratchet means being effective to provide adjustment means to selectively vary the length of said cable extending from said temple piece.

6. In an eyeglass frame of the type having a lens-carrying front frame and a temple piece extending rearwardly from the front frame and including an ear-piece at its rearward end and adapted to engage the upper portion of the wearer's ear, a retaining assembly comprising an earlobe-encircling member adapted to be engaged with the lower portion of the wearer's ear, adjustable mounting means on said temple piece, and flexible securement means interconnecting said earlobe-encircling member and said mounting means, said mounting means including biasing means for biasing said earlobe-encircling member toward said temple piece and blocking means to deactivate said biasing means, means for selectively and manually disengaging said blocking means such that said biasing means biases said earlobe-encircling member toward said temple piece for securing said eyeglass frame on the person of the wearer.

References Cited in the file of this patent
FOREIGN PATENTS

| | | |
|---|---|---|
| 326,111 | Great Britain | Mar. 6, 1930 |
| 656,899 | Germany | Feb. 18, 1938 |